Patented May 20, 1952

2,597,809

UNITED STATES PATENT OFFICE 2,597,809

MANUFACTURE OF SYNTANS

John Miglarese, Cincinnati, Ohio, assignor to The United States Leather Company, New York, N. Y., a corporation of New Jersey No Drawing. Application September 8, 1948, Serial No. 48,324

4 Claims. (Cl. 260—124)

My invention relates to syntans made from the lignin compounds resulting from practice of the soda sulphate process of paper manufacture.

It is known that lignin contains an aromatic nucleus, and that when properly subjected to degradation simple phenolic substances are produced. One of the chief simple substances produced from degradational products of lignin is vanillin, a phenolic aldehyde with a methoxyl group adjacent to the phenolic group.

In my co-pending application Serial No. 48,322 filed September 8, 1948, issued August 14, 1951, Patent No. 2,564,022, I have disclosed the manufacture and use of a syntan composed of vanillin which, with phenol, is condensed and sulphonated with sulphuric acid in a substantially simultaneous reaction.

In the preparation of syntans the water soluble lignin-sulfonic acid compounds present in sulphite waste liquors resulting from the practice of the sulphite process of paper manufacture have been extensively used. My invention relates to the use of water insoluble lignin compounds.

In my co-pending application Serial No. 48,323 filed September 8, 1948, now abandoned, I have disclosed the use of the lignin compounds occurring in the waste liquors resulting from the practice of the soda or sulphate process of paper manufacture as fillers for leather coincident with its being tanned or auxiliary to tanning.

It is the object of my invention as set forth herein to incorporate the combined action of the methods disclosed in my co-pending applications in the preparation of a tanning material made from the lignin compounds resulting from the soda or sulphate process of paper manufacture.

It is an object of my invention to use lignin like materials, especially soda lignin known commercially as "Meadol" and made by the Mead Corporation, and "Indulin" made by The West Virginia Pulp and Paper Company, in a novel way to make syntans. Soda lignin is a water-insoluble product produced from the waste liquors or black liquors of the soda and sulphate processes of pulp manufacture by treating the liquors with acid to precipitate the lignin and washing and drying the product. See, e. g., Industrial and Engineering Chemistry, vol. 32 (1940), pp. 1399–1400.

It is difficult to identify the degradation products formed from lignin compounds dissolved in phenol when acted upon with sulfonating agents, but there can not be much doubt that fragments of vanillin like materials (that is phenolic aldehydes), are released, and these are condensed with the phenols to form tanning agents.

Vanillin is a monomeric residue of lignin and lignin is a polymeric substance composed in part of vanillin like materials. Since the phenolic aldehyde vanillin is closely related to lignin, then lignin, by my preferred treatment, makes vanillin like materials which are reactive and produce tanning agents with phenol.

The following examples illustrate different ways in which a tanning agent may be made from lignin, particularly soda lignin as it occurs in the waste liquors resulting from practice of the soda process of making paper and as sold under the trade names Meadol and Indulin. These two products are chemically equivalent.

Example 1

100 grams of phenol and 50 grams of soda lignin (Meadol) or (Indulin) are warmed on water bath until soda lignin is dissolved in the phenol. 75 c. c. of concentrated 98% sulfuric acid is added dropwise with stirring at temperature of 50–60° C., at the end of an hour or so, increase the temperature to 95° C. (keeping below 100° C.), and stir for about 2 hours. The mass is tested and found to be completely soluble in water. The acidity is reduced with alkali to a pH of 10, then acidified to a pH of 3.5 with organic acids such as lactic. The tanning material is ready for hide or skin.

The preferable way of making a leather is to place depickled calf or sheep skin in a 1% solution of tanning material and at a pH of 3.5. The volume ratio is 5 parts tanning liquor to 1 part skin or hide. After 24 hours, in the case of sheep skin, a nice well filled plump, good feeling leather is produced.

Example 2

Dissolve 40 grams of "Indulin" in 100 grams of phenol and sulfonate with 65 c. c. of concentrated 98% sulfuric acid. Drop the acid into the lignin phenol mixture through the course of ½ hour with stirring, keeping the temperature around 50–60° C., using the water bath, stirring at 60° C. for 1 hour being adequate. Then the temperature is raised to 95° C. for 2 hours with stirring; the mass is treated with a solution of $Na_2CO_3$ to a pH of 10, then acidified with formic acid to a pH of 3.5. The material is then ready for tanning. The mass is diluted to form a solution of ½% tannin and pH 3.5. A piece of calf skin introduced and tanned through in 72 hours. The ratio of volumes of the skin to liquor is 1 to 6. A nice brown good feeling leather is produced when washed and dried.

Example 3

Dissolve 500 grams "Meadol" in 100 grams of phenol, place 100 grams of acetic anhydride in the phenol-"Meadol" mixture. Sulfonate with 650 c. c. of concentrated $H_2SO_4$ as in Example 1. The mass is then neutralized to a pH of 3.5 with sodium hydroxide and is ready for tanning. A piece of sole leather is made by placing a piece of bated hide in a weak liquor of ½% tannin, and pH of 4.6, then progressively day by day increase the tannin 1% for 10 days, and decrease pH by 1 each day; at the end of 10 days the pH is 3.5 and the tannin concentration is 10%. Permit to stand for 10 more days under the conditions of 10th day. The leather produced is plump and firm. It is oiled, filled, dried and finished.

The foregoing examples and the fact that the leather produced has a plump, soft, leather like feel suggests that a complicated series of reactions have taken place and for purposes of explanation and not because I am assured of the exactness of the chemical reactions involved.

As the cost of vegetable tanning materials is very high and as the soda lignin products commercially known as Meadol and Indulin are available in large commercial quantities, my process offers an opportunity for material savings in the cost of tanning of leather, which considering the excellence of the quality of the leather produced, is a development of considerable commercial importance.

I have further found that the tanning material made in accordance with the examples may be used by itself for tanning leather or it may be mixed with vegetable tanning reagents such as Quebracho and the like. Further in determining the pH (4.6 to 3.5) I may employ a mixed alkali buffer salt such as is described in my copending application, Serial No. 714,913, filed December 7, 1946, now abandoned.

Having thus described my invention, what I claim as new and desire to secure by Letters Patent is:

1. The process of preparing a water-soluble tanning material which comprises dissolving water-insoluble soda lignin in a phenol in proportions from about 1 part of soda lignin to 2 parts of phenol to about 5 parts of soda lignin to 1 part of phenol, sulfonating the same by the gradual and progressive addition of concentrated sulfuric acid with stirring at a temperature around 50 to 60° C. with subsequent increase in temperature to around 95° C. to form a water soluble product, and reducing the acidity of the solution to a pH of around 3.5.

2. The process according to claim 1 in which the proportions of soda lignin and phenol are about 1:2.

3. A tanning material produced in accordance with the process of claim 1.

4. A tanning material produced in accordance with the process of claim 2.

JOHN MIGLARESE.

REFERENCES CITED

The following references are of record in the file of this patent:

UNITED STATES PATENTS

| Number | Name | Date |
|---|---|---|
| 1,430,477 | Tullis | Sept. 26, 1922 |
| 1,539,517 | Schmidt | May 26, 1925 |
| 2,040,212 | Orthner | May 12, 1936 |
| 2,092,622 | Koch et al. | Sept. 7, 1937 |
| 2,099,717 | Alles | Nov. 23, 1937 |
| 2,122,124 | Alles | June 28, 1938 |
| 2,148,893 | Bauer | Feb. 28, 1939 |
| 2,184,622 | Mauthe | Dec. 26, 1939 |
| 2,186,509 | Wallace | Jan. 29, 1940 |
| 2,191,737 | Alles | Feb. 27, 1940 |

OTHER REFERENCES

"The Chemistry of Leather Manufacture," by McLaughlin et al., published 1945 by Reinhold Publishing Company, pages 687, 689.